United States Patent
Yoon

(10) Patent No.: US 11,759,752 B2
(45) Date of Patent: Sep. 19, 2023

(54) QUICK TRACER INJECTION FOR MONITORING OSMOSIS MEMBRANE INTEGRITY

(71) Applicant: Ecolab USA Inc., Saint Paul, MN (US)

(72) Inventor: Seong-Hoon Yoon, Naperville, IL (US)

(73) Assignee: ECOLAB USA INC., Saint Paul, MN (US)

( * ) Notice: Subject to any disclaimer, the term of this patent is extended or adjusted under 35 U.S.C. 154(b) by 798 days.

(21) Appl. No.: 16/706,181

(22) Filed: Dec. 6, 2019

(65) Prior Publication Data

US 2020/0197875 A1   Jun. 25, 2020

Related U.S. Application Data

(60) Provisional application No. 62/783,441, filed on Dec. 21, 2018.

(51) Int. Cl.
| | |
|---|---|
| *B01D 65/10* | (2006.01) |
| *B01D 61/02* | (2006.01) |
| *C02F 1/44* | (2023.01) |
| *G01N 15/08* | (2006.01) |

(52) U.S. Cl.
CPC .......... *B01D 65/10* (2013.01); *B01D 61/025* (2013.01); *C02F 1/441* (2013.01); *G01N 15/0826* (2013.01); *G01N 2015/086* (2013.01)

(58) Field of Classification Search
None
See application file for complete search history.

(56) References Cited

U.S. PATENT DOCUMENTS

| | | |
|---|---|---|
| 5,462,879 A | 10/1995 | Bentsen |
| 6,360,582 B1 | 3/2002 | Chelvayohan et al. |
| 6,730,227 B2 | 5/2004 | Zeiher et al. |
| 6,821,428 B1 | 11/2004 | Zeiher et al. |
| 6,838,001 B2 | 1/2005 | Zeiher et al. |
| 6,838,002 B2 | 1/2005 | Zeiher et al. |

(Continued)

FOREIGN PATENT DOCUMENTS

| | | |
|---|---|---|
| CN | 204360110 U | 5/2015 |
| EP | 2322913 A2 | 5/2011 |
| GB | 822848 A | 11/1959 |

OTHER PUBLICATIONS

International Patent Application No. PCT/US2019/064994, International Search Report and Written Opinion dated Mar. 19, 2020, 13 pages.

(Continued)

*Primary Examiner* — Richard C Gurtowski
(74) *Attorney, Agent, or Firm* — Fredrikson & Byron, P.A.

(57) ABSTRACT

A fluorometric monitoring technique can be used to rapidly evaluate the efficiency of an osmosis membrane. In some examples, the technique includes injecting a bolus of fluorescent tracer into a feed stream. The tracer may be introduced for a period of time less than what is required for the tracer to reach an equilibrium concentration in the permeate stream. The feed stream and the permeate stream may be fluorometrically analyzed to determine a flow rate-independent cumulative-time concentration of the fluorescent tracer in the both streams. The efficiency of the osmosis membrane can then be determined based on these flow rate-independent cumulative-time concentrations.

24 Claims, 7 Drawing Sheets

(56) References Cited

U.S. PATENT DOCUMENTS

| | | | |
|---|---|---|---|
| 6,999,173 | B2 | 2/2006 | Kleinfeld et al. |
| 8,076,154 | B2 | 12/2011 | Erickson et al. |
| 10,317,385 | B2 | 6/2019 | Li et al. |
| 2003/0183575 | A1* | 10/2003 | Zeiher .................... B01D 61/54 210/639 |
| 2004/0104169 | A1 | 6/2004 | Zeiher et al. |
| 2004/0104171 | A1 | 6/2004 | Zeiher et al. |
| 2004/0115757 | A1 | 6/2004 | Ho et al. |
| 2004/0185472 | A1 | 9/2004 | Kelle Zeiher et al. |
| 2006/0160226 | A1 | 7/2006 | Johnson |
| 2007/0084721 | A1 | 4/2007 | Hsung et al. |
| 2010/0107723 | A1 | 5/2010 | Hajishah et al. |
| 2012/0015445 | A1 | 1/2012 | Kellner et al. |
| 2015/0001139 | A1 | 1/2015 | Cohen et al. |
| 2016/0123882 | A1 | 5/2016 | Gilmore et al. |
| 2017/0234793 | A1 | 8/2017 | Gilmore |
| 2019/0271646 | A1 | 9/2019 | Yoon |

OTHER PUBLICATIONS

Frenkel et al., "New techniques for real-time monitoring of membrane integrity for virus removal," WateReuse Research Foundation, 2014, 104 pages.

Lozier et al., "Microbial Removal and Integrity Monitoring of High-Pressure Membranes," Awwa Research Foundation, 2003, 220 pages.

Marra et al., "An Evaluation of an In situ Fluorometer for the Estimation of Chlorophyll a," Lamont-Doherty Earth Observatory of Columbia University, Technical Report, LDEO-93-1, May 1993, 41 pages.

Pype et al., "National Validation Guidelines for Water Recycling: Reverse Osmosis Membranes," Australian Water Recycling Centre of Excellence, The University of Queensland, Sep. 2015, 143 pages.

Surawanvijit et al., "Pulsed marker method for real-time detection of reverse osmosis membrane integrity loss," Desalination, vol. 370, 2015, pp. 25-32.

Frenkel et al., "New Techniques for Real-Time Monitoring of Reverse Osmosis Membrane Integrity for Virus Removal," White Paper and Presentation Slides, 2017 Membrane Technology Conference and Exposition, 76 pages.

Frenkel et al., "New Techniques for Real-Time Monitoring of Reverse Osmosis (RO) Membrane Integrity," WateReuse Research Foundation Webcast Series, Apr. 10, 2014, 69 pages.

Frenkel et al., "New Techniques for Real-Time Monitoring of Membrane Integrity for Virus Removal: Pulsed-Marker Membrane Integrity Monitoring System," WateReuse, Retrieved online from https://watereuse.org/watereuse-research/new-techniques-for-real-time-monitoring-of-membrane-integrity-for-virus-removal-pulsed-marker-membrane-integrity-monitoring-system/, 2014, 2 pages.

Frenkel et al., "New Techniques for Real-Time Monitoring of RO Membrane Integrity for Virus Removal," Ultrapure Water, Apr. 2017, 9 pages.

* cited by examiner

QUICK TRACER INJECTION FOR MONITORING OSMOSIS MEMBRANE INTEGRITY

CROSS-REFERENCE

This application claims the benefit of U.S. Provisional Patent Application No. 62/783,441, filed Dec. 21, 2018, the entire contents of which are incorporated herein by reference.

TECHNICAL FIELD

This disclosure relates to membrane separation processes and, more particularly, to evaluating the integrity of membranes used in membrane separation processes.

BACKGROUND

Membrane separation is a technology that selectively separates materials via pores and/or minute gaps in the molecular arrangement of a continuous membrane structure. Membrane separations can be classified by pore size and by the separation driving force. Example membrane separation techniques include microfiltration (MF), ultrafiltration (UF), ion-exchange (IE), and reverse osmosis (RO). For example, reverse osmosis is widely used in water purification processes to remove ions, bacteria, and other molecules and larger particles from the water. In a reverse osmosis process, an applied pressure is used to overcome an osmotic pressure across the membrane, allowing substantially pure solvent (e.g., water) to pass through the membrane while a residual solute is retained on the pressurized side of the membrane.

In practice, the degree of purification achieved using the membrane separation process is dictated, at least in part, by the quality and integrity of the membrane used in the process. If there are chemical and/or mechanical failures to the membrane structure, impurities can pass through the membrane breach and into the resulting "purified" product stream. In the case of water purification, harmful impurities and pathogens (e.g., waterborne enteric viruses, *Cryptosporidium*, *Giardia* cysts, nanoparticles, organic compounds, and so forth), which can be in the nanometer range, can pass through the membrane breach into the clean water stream, potentially creating health risks.

SUMMARY

In general, this disclosure is directed to systems and techniques for evaluating the efficiency of osmosis membranes. In some examples, a fluorometric monitoring process may be used to monitor the performance of a membrane by introducing a fluorescent tracer into a feed stream and then detecting the fluorescent tracer in a permeate stream downstream of the separation membrane. The extent to which the fluorescent tracer passes through the membrane can provide an indication of the integrity of the membrane.

In practice, it has been observed that fluorescent tracer introduced into a feed stream of a membrane separation process does not immediately pass through to the permeate stream at a concentration corresponding to the integrity or efficiency of the membrane. Rather, there is a time lag between when the dosing of the tracer to the feed stream is started and when a stable (e.g., substantially constant) corresponding tracer concentration is observed in the permeate stream. For example, it may take 30 minutes, an hour, or more between when dosing of the tracer is started to the feed stream and when an equilibrium concentration of the tracer is observed in the permeate stream. The concentration of the tracer observed in the permeate stream over this equilibrating period can increase with time.

Traditional techniques to evaluate the efficiency of the membrane may require a stable feed stream tracer concentration and a stable permeate stream tracer concentration. Otherwise, if data corresponding to a permeate stream tracer concentration that has not reached equilibrium conditions is used to evaluate the efficiency of the membrane, the efficiency measurement may erroneously indicate that the membrane is rejecting more of the tracer (and, correspondingly, impurities desired to be removed by the membrane) than is actually the case. Accordingly, the tracer may need to be dosed for a comparatively long period of time to ensure that equilibrium trace concentrations are achieved in the separation process before evaluating the rejection efficiency of the membrane. This can increase the amount of tracer consumed, the amount of operator time needed to perform the evaluation and, correspondingly, the cost of monitoring the membrane efficiency.

In some examples according to the present disclosure, a technique for evaluating the efficiency of a separation membrane is described that involves injecting a bolus of fluorescent tracer into a feed stream. The bolus of fluorescent tracer may be injected for a period of time less than the period required for the tracer concentration in the permeate stream to reach an equilibrium concentration. For example, the fluorescent tracer may be introduced to provide a comparatively short duration bolus, with the concentration of tracer in the permeate stream continuing to increase for a period of time even after the introduction of tracer to the feed stream has terminated.

To determine the efficiency of the membrane without requiring the concentration of tracer in the permeate stream to reach equilibrium concentration, both the feed stream and the permeate stream may be fluorometrically monitored during the bolus injection. A flow rate-independent cumulative-time concentration of tracer can then be determined for each stream corresponding to the bolus injection. For example, the concentration of tracer within each stream can be measured during the bolus injection. The measured concentration can then be integrated over the measurement period corresponding to detectable levels of tracer, providing a flow rate-independent cumulative-time concentration of the fluorescent tracer. The concentration may be designated as a cumulative-time concentration because it is the cumulative concentration of tracer over the measurement time. The concentration may be designed as flow rate independent as the cumulative concentration of tracer is independent of the flow rate of the feed stream and the permeate stream, including changes in stream flow rates that may occur during the measurement period. With knowledge of the flow rate-independent cumulative-time concentration of the fluorescent tracer in the feed stream and the permeate stream, the efficiency of the membrane can be determined. For example, a rejection efficiency fraction can be determined by ratioing the flow rate-independent cumulative-time concentration of the fluorescent tracer in the permeate stream to the flow rate-independent cumulative-time concentration of the fluorescent tracer in the feed stream.

In one example, a method for monitoring an osmosis membrane separation process is described. The method includes introducing a bolus of fluorescent tracer into a feed stream and contacting an osmosis membrane with the feed stream, thereby generating a permeate stream and a concentrate stream. The method includes fluorometrically analyzing the feed stream and determining therefrom a measured concentration of the fluorescent tracer in the feed stream over a first period of time corresponding to the bolus. The method also includes fluorometrically analyzing the permeate stream and determining therefrom a measured concentration of the fluorescent tracer in the permeate stream over a second period of time corresponding to the bolus. The method further involves determining a flow rate-independent cumulative-time concentration of the fluorescent tracer in the feed stream based on the measured concentration of the fluorescent tracer in the feed stream over the first period of time and determining a flow rate-independent cumulative-time concentration of the fluorescent tracer in the permeate stream based on the measured concentration of the fluorescent tracer in the permeate stream over the second period of time. In addition, the method includes determining an efficiency of the osmosis membrane based on comparison of the flow rate-independent cumulative-time concentration of the fluorescent tracer in the feed stream to the flow rate-independent cumulative-time concentration of the fluorescent tracer in the permeate stream.

In another example, a system is described that includes a fluorescent tracer pump configured to introduce a bolus of fluorescent tracer into a feed stream, a semi-permeable membrane configured to separate the feed stream into a permeate stream and a concentrate stream, one or more fluorometers configured to fluorometrically analyze the feed stream and the permeate stream, and a controller communicatively coupled to the one or more fluorometers. The example specifies that the controller is configured to control the one or more fluorometers to fluorometrically analyze the feed stream and determine therefrom a measured concentration of the fluorescent tracer in the feed stream over a first period of time corresponding to the bolus. The one or more controllers are also configured to control the one or more fluorometers to fluorometrically analyze the permeate stream and determine therefrom a measured concentration of the fluorescent tracer in the permeate stream over a second period of time corresponding to the bolus. The example specifies that the one or more controllers are also configured to determine a flow rate-independent cumulative-time concentration of the fluorescent tracer in the feed stream based on the measured concentration of the fluorescent tracer in the feed stream over the first period of time and determine a flow rate-independent cumulative-time concentration of the fluorescent tracer in the permeate stream based on the measured concentration of the fluorescent tracer in the permeate stream over the second period of time. In addition, the one or more controllers are also configured to determine an efficiency of the semi-permeable membrane based on comparison of the flow rate-independent cumulative-time concentration of the fluorescent tracer in the feed stream to the flow rate-independent cumulative-time concentration of the fluorescent tracer in the permeate stream.

The details of one or more examples are set forth in the accompanying drawings and the description below. Other features, objects, and advantages will be apparent from the description and drawings, and from the claims.

DETAILED DESCRIPTION

In general, this disclosure describes system and techniques for monitoring a membrane separation process, including monitoring the rejection efficiency of one or more membranes used in the separation process. Monitoring the rejection efficiency of the membrane may be useful to ensure that impurities intended to be removed by the membrane separation process during normal operation are being adequately removed. If the rejection efficiency of the one or more membranes used in the separation process is determined, e.g., using techniques according to the present disclosure, to be less than a threshold efficiency, the one or more membranes may be replaced.

In some examples, the monitoring technique involves injecting a bolus of tracer into a feed stream for a separation membrane and fluorometrically analyzing the feed stream and the permeate stream. The feed stream and the permeate streams can be fluorometically analyzed over first and second monitoring periods, respectively, when measurable amounts of fluorescent tracer are detectable in each stream. A flow rate-independent cumulative-time concentration of the fluorescent tracer in the feed stream and a flow rate-independent cumulative-time concentration of the fluorescent tracer in the permeate stream can then be determined based on measured concentrations of the fluorescent trace in each respective stream. An efficiency of the membrane can be determined based on comparison of the flow rate-independent cumulative-time concentration of the fluorescent tracer in the feed stream to the flow rate-independent cumulative-time concentration of the fluorescent tracer in the permeate stream.

As used herein, the term "flow rate-independent cumulative-time concentration" means the cumulative products of instantaneous tracer concentration in a stream with the duration of that tracer concentration in the stream for a period of time, without factoring in the flow rate of the stream.

Figure 1:
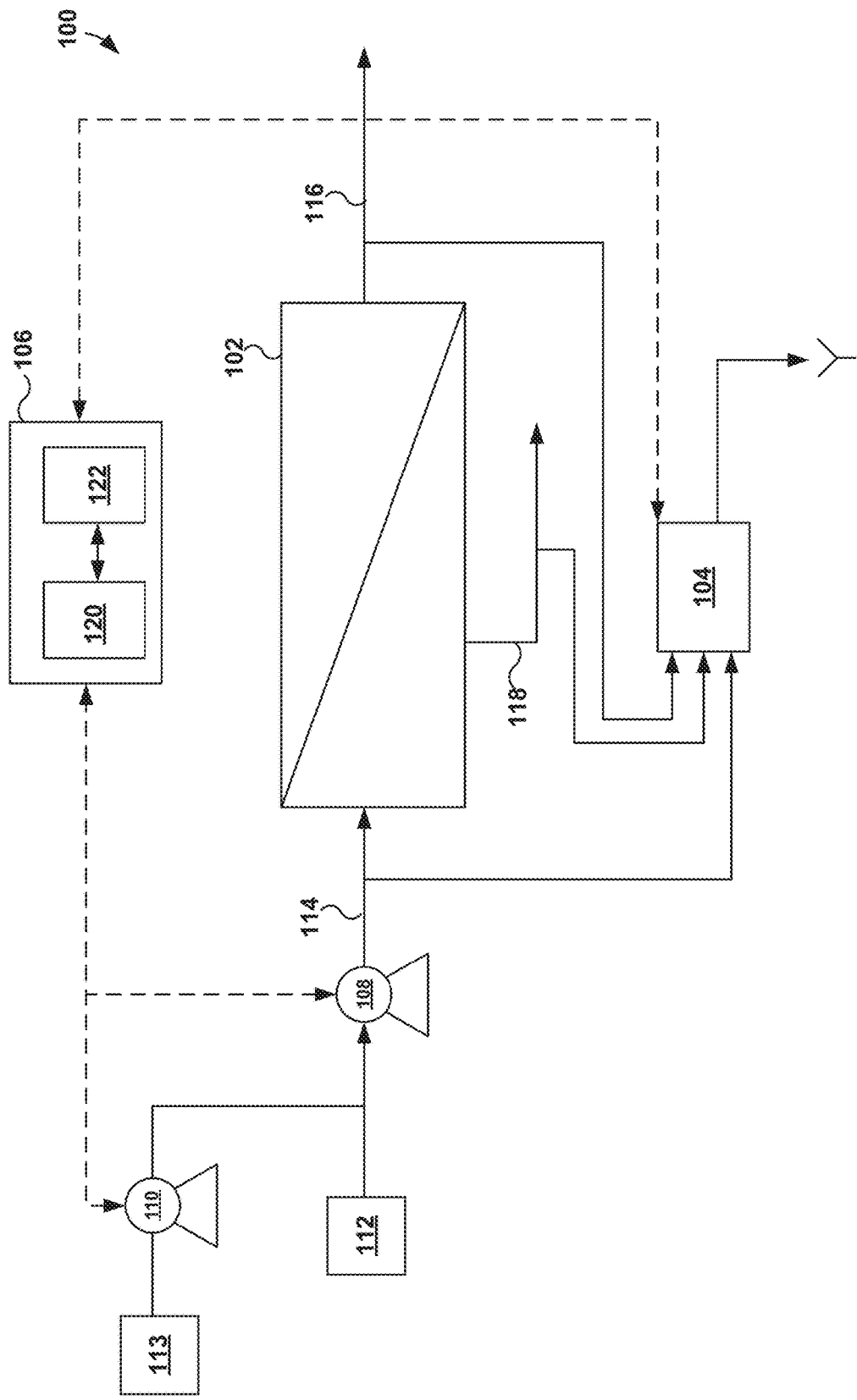
FIG. 1 is a diagram illustrating an example membrane separation system, the efficiency of which may be monitored according to the disclosure.

FIG. 1 is a conceptual diagram illustrating an example membrane separation system 100, the efficiency of which can be monitored as described herein. System 100 includes a separation membrane 102, at least one fluorometer 104, and a controller 106. System 100 in FIG. 1 is also illustrated as including a feed stream pressurization pump 108 and a fluorescent tracer pump 110. Feed stream pressurization pump 108 is in fluid communication with a source 112 of fluid to be purified using membrane 102. Fluorescent tracer pump 110 is in fluid communication with a source of fluorescent tracer 114 to be introduced into a feed stream contacting membrane 102. In operation, a feed stream 114 is supplied to membrane 102, which is capable of treating or purifying the feed stream by dividing the feed stream into at least a first stream and a second stream, such as a permeate stream 116 and a concentrate stream 118 (which may also be referred to as a reject stream).

Fluorometer 104 is optically connected to one or more of feed stream 114, permeate stream 116, and/or concentrate stream 118 and is configured to fluorometrically analyze the stream. In the illustrated configuration, a single fluorometer 104 is illustrated as being positioned to receive slip streams from each of the feed stream 114, permeate stream 116, and concentrate stream 118. When so configured, valves or other flow control mechanisms may be used to selectively place the fluorometer in fluid communication with each of the respective streams at different times. In other configurations, fluorometer 104 may be implemented to only fluorometrically analyze a single stream (e.g., feed stream 114 or permeate stream 116), or two of the three stream (e.g., feed stream 114 and permeate stream 116). In these alternative configurations, system 100 may include more than one fluorometer, such as a separate fluorometer for each stream to be fluorometrically analyzed during operation.

Controller 106 is communicatively connected to fluorometer 104, feed stream pressurization pump 108, fluorescent tracer pump 110, and optionally any other controllable components or sensors that may be desirably implemented in system 100. Controller 106 includes processor 120 and memory 122. Controller 106 communicates with controllable components in system 100 via connections. For example, signals generated by fluorometer 104 may be communicated to controller 106 via a wired or wireless connection, which in the example of FIG. 1 is illustrated as wired connection. Memory 122 stores software for running controller 106 and may also store data generated or received by processor 120, e.g., from fluorometer 104. Processor 120 runs software stored in memory 122 to manage the operation of system 100.

As described in greater detail below, fluorescent tracer pump 110 may be used to inject a bolus of tracer into feed stream 114. Fluorometer 104 may be used to fluorometrically analyze the performance of membrane 102 by fluorometrically analyzing feed stream 114 and permeate stream 116. Fluorometer 104 can emit excitation light into a fluid stream/sample under analysis and receive fluorescent emissions generated in response to the excitation light. The amount of fluorescent emission light detected by the fluorometer can be processed with reference to calibration information stored in memory to determine a concentration of a fluorescing tracer in the fluid sample under analysis. This, in turn, can provide an indication of the separation performance of membrane 102.

During operation of system 100, membrane 102 can be contacted with fluid to be purified from source 112 to remove ion, molecules, pathogens, and/or other particulate contaminants. For example, feed stream 114 can contain various solutes, such as dissolved organics, dissolved inorganics, dissolved solids, suspended solids, the like or combinations thereof. Upon separation of feed stream 114 into permeate stream 116 and concentrate stream 118, in membrane 102, the permeate stream can contain a substantially lower concentration of dissolved and/or suspended solutes as compared to the feed stream. On the other hand, the concentrate stream 118 can have a higher concentration of dissolved and/or suspended solutes as compared to the feed stream. In this regard, the permeate stream 116 represents a purified feed stream, such as a purified aqueous feed stream.

System 100 and membrane 102 can be configured for any desired type of membrane separation process, including cross flow separation processes, dead-end flow separation processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Typically, however, system 100 and membrane 102 may be implemented as a reverse osmosis, ultrafiltration, microfiltration, or nanofiltration membrane separation process.

In reverse osmosis, feed stream 114 is typically processed under cross flow conditions. When so configured, feed stream 114 may flow substantially parallel to the membrane surface such that only a portion of the feed stream diffuses through the membrane as permeate. The cross flow rate is typically high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

System 100 can employ a variety of different types of membranes as membrane 102. Such commercial membrane element types include, without limitation, hollow fiber membrane elements, tubular membrane elements, spiral-wound membrane elements, plate and frame membrane elements, and the like. For example, reverse osmosis typically uses spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction may have one channel that can receive an inlet flow. The inlet stream flows longitudinally along the membrane module and exits the other end as a concentrate stream. Within the module, water can pass through the semi-porous membrane and is trapped in a permeate channel, which flows to a central collection tube. From this tube it can flow out of a designated channel and is collected.

In different applications, membrane 102 can be implemented using a single membrane element or multiple membrane elements depending on the application. For example, multiple membrane elements may be used forming membrane modules that are stacked together, end to end, with inter-connectors joining the permeate tubes of the first module to the permeate tube of the second module, and so on. These membrane module stacks can be housed in pressure vessels. Within the pressure vessel, feed stream 114 can pass into the first module in the stack, which removes a portion of the water as permeate water. The concentrate stream from the first membrane can then become the feed stream of the second membrane and so on down the stack. The permeate streams from all of the membranes in the stack can be collected in the joined permeate tubes. In these applications, the feed stream entering the first module and/or the combined permeate stream and/or the final concentrate stream from the last module in the stack may be monitored using one or more fluorometers 104.

Within most reverse osmosis systems, pressure vessels may be arranged in either "stages" or "passes." In a staged membrane system, the combined concentrate streams from a bank of pressure vessels can be directed to a second bank of pressure vessels where they become the feed stream for the second stage. Commonly, systems have two to three stages with successively fewer pressure vessels in each stage. For example, a system may contain four pressure vessels in a first stage, the concentrate streams of which feed two pressure vessels in a second stage, the concentrate streams of which in turn feeds one pressure vessel in the third stage. This is designated as a "4:2:1" array. In a staged membrane configuration, the combined permeate streams from all pressure vessels in all stages may be collected and used without further membrane treatment. Multi-stage systems are commonly used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels can be combined without further membrane treatment of each individual stream. Multi-pass systems are typically used when very high purity water is required, for example in the microelectronics or pharmaceutical industries. When system 100 is implemented as a reverse osmosis process, one or more membranes 102 may be configured as a multi-stage and/or multi-pass system.

While system 100 and membrane 102 may be implemented as cross-flow filtration process, in other configurations, the system may be arranged for conventional filtration of suspended solids by passing feed stream 114 through a filter media or membrane in a substantially perpendicular direction. This arrangement can create one exit stream (e.g., purified stream 114) during the service cycle. Periodically, the filter may be backwashed by passing a clean fluid in a direction opposite to the feed, generating a backwash effluent containing species that have been retained by the filter. In this arrangement, system 100 may have a feed stream 114, a purified stream 116, and a backwash stream 118. This type of membrane separation is typically referred to as dead-end flow separation and is typically limited to the separation of suspended particles greater than about one micron in size.

System 100 can be used to purify any desired type of fluid. Example aqueous (water-based) liquid feed sources 112 that may be purified using system 100 include raw water streams (e.g., extracted from a fresh water source), waste water and recycle water streams (e.g., from municipal and/or industrial sources), streams in food and beverage processes, streams in pharmaceutical processes, streams in electronic manufacturing, streams in utility operations, streams in pulp and paper processes, streams in mining and mineral processes, streams in transportation-related processes, streams in textile processes, streams in plating and metal working processes, streams in laundry and cleaning processes, streams in leather and tanning processes, streams in paint processes, and combinations thereof.

The one or more fluorometers 104 used in system 100 may be implemented in a number of different ways in system 100. In the example shown in FIG. 1, a pipe, tube, or other conduit is connected between a main fluid pathway and a flow chamber of fluorometer 104, e.g., providing a slip stream or sample stream from the bulk of flowing liquid. In such examples, the conduit can fluidly connect the flow chamber (e.g., an inlet of the flow chamber) of fluorometer 104 to the main fluid pathway. As fluid moves through the main fluid pathway, a portion of the fluid may enter the conduit and pass adjacent a sensor head positioned within a fluid chamber, thereby allowing fluorometer 104 to determine one or more characteristics of fluid flowing through the fluid pathway. After passing through the flow chamber, analyzed fluid may or may not be returned to the main fluid pathway, e.g., via another conduit connecting an outlet of the flow chamber to the fluid pathway. In alternative configurations, fluorometer 104 positioned in-line with a main fluid pathway, e.g., allowing the fluorometer to directly sample and/or fluorometrically analyze the primary flowing fluid stream without drawing a slip stream.

In either case, when implemented to receive fluid directly from a main fluid pathway or stream without user intervention, fluorometer 104 may be characterized as an online optical sensor. Controller 106 may control fluorometer 104 to continuously fluorometrically analyze a fluid stream over a period of time or intermittently fluorometrically analyze the fluid stream at periodic intervals. When fluorometer 104 is implemented as an online fluorometer, it may be difficult to remove the fluorometer from service for calibration if such removal may require shutting down system 100 or causing undesirable monitoring gaps in the performance of the system.

In other applications, fluorometer 104 may be used to fluorometrically analyze a stationary volume of fluid that does not flow through a flow chamber of the optical sensor. For example, in these alternative configurations, fluorometer 104 may be implemented as an offline monitoring tool (e.g., as a handheld sensor), that requires filling the optical sensor with a fluid sample manually extracted from system 100.

To monitor the performance of membrane 102 according to some examples of the present disclosure, a bolus of fluorescent tracer from fluorescent tracer source 113 can be introduced into feed stream 114. Operating under the control of controller 106, fluorescent tracer pump 110 can inject fluorescent tracer into feed stream 114 upstream of membrane 102. In the illustrated example, fluorescent tracer is shown as being introduced upstream of feed stream pump 108, although in other configurations, may be introduced downstream of the feed stream pump. In either case, the feed stream 114 containing an amount of fluorescent tracer can contact membrane 102 to undergo a separation or purification process.

The bolus of fluorescent tracer introduced by fluorescent tracer pump 110 may be a fixed volume of tracer introduced at an injection flow rate over a period of time. The specific flow rate used may vary, e.g., based on the type of tracer and the size of the system 100. Further, the flow rate may be substantially constant (e.g., vary by +/−3%) during the entire duration of dosing or may change during dosing. In some examples, the flow rate may be effective to provide a tracer concentration in the feed stream ranging from 10 ppm to 100 ppm, such as from 20 ppm to 50 ppm.

Operating under the control of controller 106 (or manual operator control), fluorescent tracer pump 110 can deliver the bolus of fluorescent tracer over a deliver period of time. In some applications, the period of time is sufficiently short such that the resulting concentration of tracer in the permeate stream does not reach an equilibrium concentration prior to fluorescent tracer pump 110 ceasing delivery of fluorescent tracer to the feed stream. As discussed above, a time delay may exist between when fluorescent tracer is initially dosed to feed stream 114 (e.g., at a constant rate) and a resultant equilibrium fluorescent tracer concentration is observed in permeate stream 116. The concentration of fluorescent tracer observed in the permeate stream may progressively increase from a zero level up to an equilibrium level corresponding to the concentration of fluorescent tracer dosed to the feed stream.

In some examples according to the present disclosure, however, fluorescent tracer pump 110 may deliver fluorescent tracer to feed stream 114 for a period of time shorter than the time required for the concentration of fluorescent tracer in permeate stream 116 to reach an equilibrium with the concentration in the feed stream. As a result, the concentration of fluorescent tracer in permeate stream 116 may be less than the equilibrium level when fluorescent tracer pump 110 ceases delivering fluorescent tracer to the feed stream. In addition, the concentration of fluorescent tracer in permeate stream 116 may increase following fluorescent tracer pump 110 ceasing delivery of fluorescent tracer to the feed stream before subsequently decreasing. In some examples, fluorescent tracer pump 110 may deliver fluorescent tracer to feed stream 114 for a period of time ranging from 1 second to 60 minutes, from 5 second to 30 minutes, from 30 seconds to 15 minutes, from 1 minute to 10 minutes, or from 30 seconds to 5 minutes. The flow rate of feed stream 114 and permeate stream 116 may be substantially constant (e.g., +/−5%, such as +/−3%, or +/−1%) during the bolus delivery and monitoring, or the flow rate may more than the foregoing amounts.

While fluorescent tracer pump 110 can be controlled in system 100 to deliver the entire bolus of fluorescent tracer to feed stream 114 before the concentration of fluorescent tracer reaches a corresponding concentration equilibrium in permeate stream, the techniques discussed herein are not limited in this respect. In other applications, fluorescent tracer pump 110 can deliver the bolus of fluorescent tracer to feed stream 114 over a period of time sufficient for an equilibrium concentration of fluorescent tracer to be achieved in permeate stream 116. That being said, a shorter delivery time during which concentration equilibrium in the permeate stream is not achieve may provide processing economies not observed if a longer delivery time is used.

Fluorescent tracer pump 110 may introduce tracer into feed stream 114 at a rate and for a duration effective to achieve a rate-independent cumulative concentration of fluorescent tracer in the feed stream to range from 1 ppm-sec to 50,000 ppm-sec, such as from 1000 ppm-sec to 20,000 ppm-sec.

As with other molecules or particulates being separated out of the feed stream, a majority of the fluorescent tracer may be concentrated in concentrate stream 118. Only a small minority of the fluorescent tracer introduced into feed stream 114 may carry through to permeate stream 116, e.g., when membrane 102 is functioning as intended. The amount of fluorescent tracer passing through membrane 102 from feed stream 114 and into permeate stream 116 may be indicative of the quality and/or operational efficiency of the membrane. For example, if membrane 102 has an integrity breach affecting the separation efficiency of the membrane, a higher concentration of fluorescent tracer introduced into feed stream 114 via fluorescent tracer pump 110 may carry through to permeate stream 116 than if the membrane does not have such a breach.

Operating on a periodic or continuous monitoring basis, one or more fluorometers 104 can monitor the concentration of fluorescent tracer in one or more corresponding streams of system 100 to evaluate the performance of the system. For example, fluorometer 104 may measure feed stream 114 to determine a measured concentration of the fluorescent tracer introduced into the stream by fluorescent tracer pump 110. Fluorometer 104 may also measure permeate stream 116 to determine a measured concentration of the fluorescent tracer passing through membrane 102 and present in permeate stream 116.

With reference to calibration information stored in memory 120, controller 106 can determine a concentration of the fluorescing tracer in the fluid stream under analysis based on the fluorometric response of the stream (e.g., magnitude and/or wavelength of emissions emitted by the fluorescence tracer in the stream). For example, controller 106 may determine a concentration of the fluorescent tracer by comparing the magnitude of fluorescent emissions detected from the fluid under analysis with information relating known magnitudes of the fluorescent emissions to known concentrations of the tracer.

With reference to instructions stored in memory, controller 106 can determine a flow rate-independent cumulative-time concentration of the fluorescent tracer in the feed stream based on the measured concentration of the fluorescent tracer in the feed stream over the first period of time. Controller 106 can also determine a flow rate-independent cumulative-time concentration of the fluorescent tracer in the permeate stream based on the measured concentration of the fluorescent tracer in the permeate stream over the second period of time. As noted above, rate-independent cumulative-time concentration corresponds to the product of tracer concentration in the stream under analysis with the duration of that tracer concentration in the stream. Accordingly, the rate-independent cumulative-time concentration represents the total volume of tracer measured by fluorometer 104 during the period of analysis.

Figure 2:
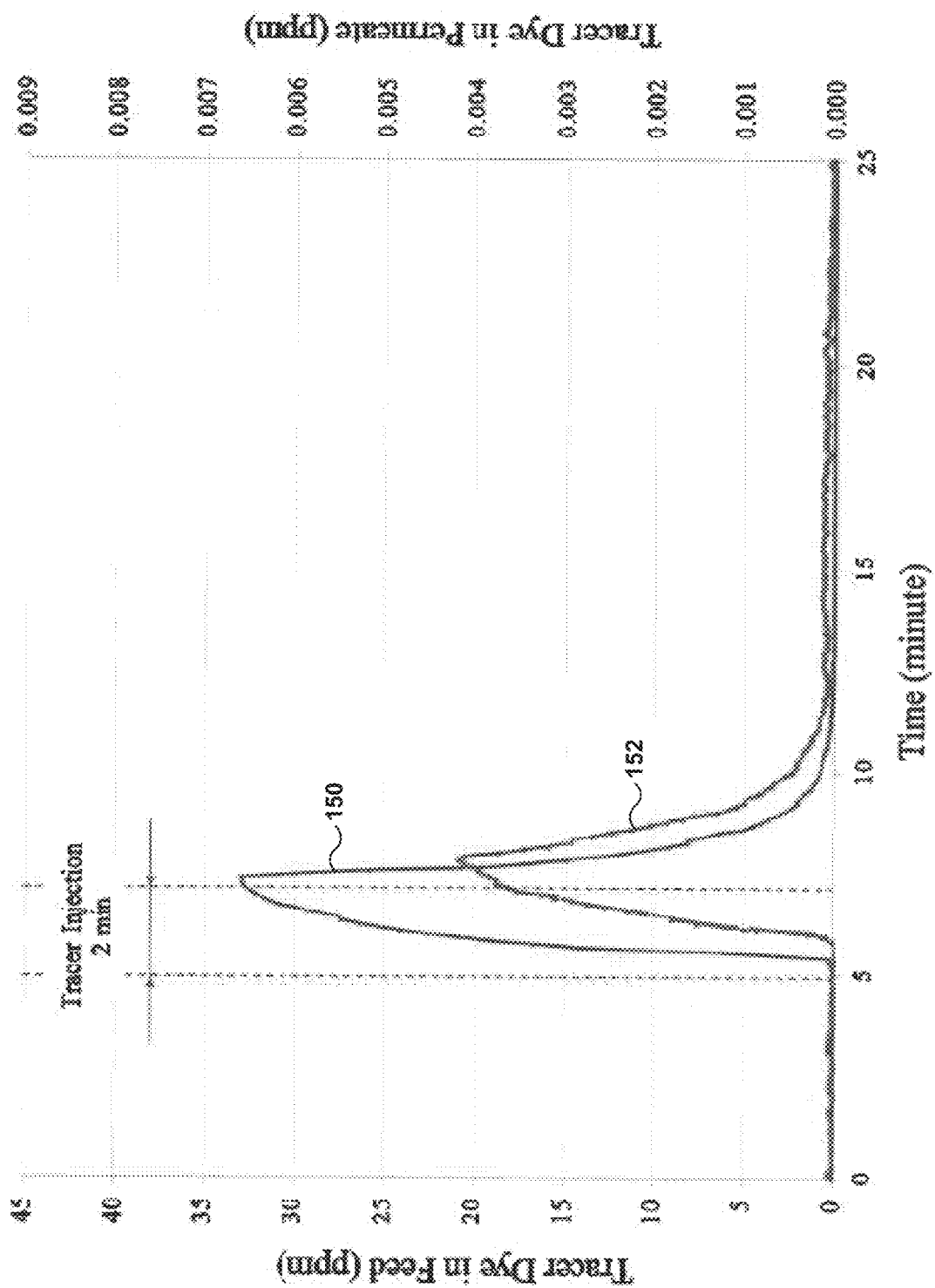
FIG. 2 is a graph showing example fluorescent tracer concentrations that may be measured in the feed stream and the permeate stream of FIG. 1 corresponding to an example injection bolus.

FIG. 2 is a graph showing example fluorescent tracer concentrations that may be measured in feed stream 114 and permeate stream 116 by one or more fluorometers 104 corresponding to an example injection bolus. The illustrated example shows an example tracer bolus injection delivered at a constant rate over a 2 minute period of time, although other tracer delivery conditions can be used as described above. In the example of FIG. 2, the concentration of tracer measured by fluorometer 104 in the feed stream 114 is represented by line 150, and the concentration of tracer measured by fluorometer 104 in the permeate stream 116 is represented by line 152. In this example, the fluorescent tracer pump 110 delivers fluorescent tracer to feed stream 114 for a period of time shorter than the time required for the concentration of fluorescent tracer in permeate stream 116 to reach an equilibrium concentration, which is represented by a concentration peak offset for the permeate stream.

Controller 106 may determine a flow rate-independent cumulative-time concentration of fluorescent tracer in a stream using the following equation:

$$A = \sum_{n=1}^{n} \left\{ \left( \frac{y_n + y_{n-1}}{2} - y_o \right)(t_n - t_{n-1}) \right\} \quad \text{Equation 1}$$

Figure 3:
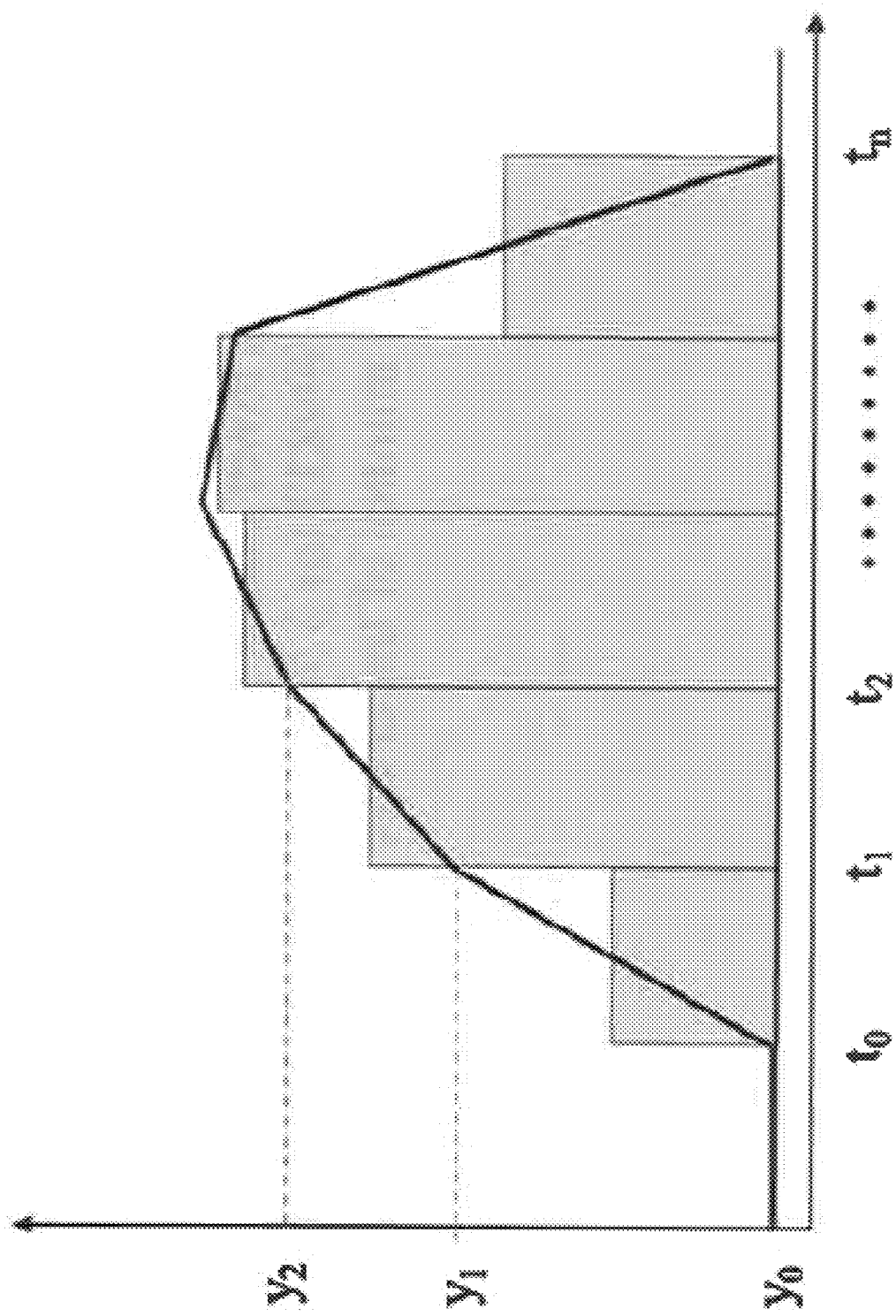
FIG. 3, which illustrates an example segmentation technique for calculating a flow rate-independent cumulative-time concentration.

In the equation above, y is the tracer concentration (e.g., in ppm), and $y_o$ is the tracer concentration with $t=t_o$. In addition, t is time (e.g., seconds), and A is the area below the curve (e.g., ppm-sec). This approach is illustrated graphically in FIG. 3, which illustrates an example segmentation technique for calculating a flow rate-independent cumulative-time concentration In practice, controller 106 may integrate the area under the curve of measured fluorescent tracer concentration for each respective stream to determine the flow rate-independent cumulative-time concentration for that stream. Controller 106 may integrate the concentration of tracer measured in feed stream 114 by fluorometer 106 over a first period of time (first time interval). Controller 106 may further integrate the concentration of tracer measured in permeate stream 116 by fluorometer 106 over a second period of time (second time interval). The first time period defines time end points along the concentration monitoring curve for feed stream 114 over which the concentration is integrated to provide the flow rate-independent cumulative-time concentration for that stream. The second time period defines time end points along the concentration monitoring curve for permeate stream 116 over which the concentration is integrated to provide the flow rate-independent cumulative-time concentration for that stream.

The time periods used for the first and second time periods may vary depending on the characteristics of the system being evaluated. In some applications, the first time period is a time within a range from 0 to 60 minutes following initial introduction of the bolus of fluorescent tracer. The second time period may be a time within a range from 0 to 240 minutes following initial introduction of the bolus of fluorescent tracer. The first and second time periods may be the same or may be different than each other. For example, the second time period may be longer than the first time period to account for the time lag or delay between when the fluorescent tracer is introduced into and measured in the feed stream and when the tracer passes into and is measured in the permeate stream. Additionally or alternatively, the second time period may be shifted (e.g., start at a time after the first time period starts) an amount that compensates for the time lag. For example, the second period of time may be shifted from the first period of time by at least 10 seconds, such as at least 1 minute, or at least 2 minutes.

Fluorometer 104 may measure the concentration of tracer in the feed and permeate streams only within the respective first and second time periods. Alternatively, fluorometer 104 may measure the concentration of tracer in the feed and/or permeate stream for an extended period (e.g., at least 2 minutes, such as at least 5 minutes, at least 10 minutes, or at least 30 minutes) before and/or the introduction and/or termination of tracer injection to the feed stream. The first and second time periods over which the measured tracer concentrations for the feed and permeate streams, respectively, are integrated can be selected from the larger period of monitored concentration data (e.g., which may include periods where there was not tracer concentration measured in the feed and/or permeate stream).

Controller 106 can store the determined flow rate-independent cumulative-time concentrations for feed stream 114 and permeate stream 116 in memory 122. Controller 106 can further determine an efficiency of membrane 120 based on comparison of the flow rate-independent cumulative-time concentration of the fluorescent tracer in the feed stream to the flow rate-independent cumulative-time concentration of the fluorescent tracer in the permeate stream. In different examples, the comparison performed between the two flow rate-independent cumulative-time concentrations may be a difference, a ratio, a product, or yet other comparison. In one example, controller 106 may calculate a dye rejection efficiency factor R based on the following equation:

$$R = 1 - \frac{C_P}{C_F} \qquad \text{Equation 2}$$

In the equation above, R is the efficiency of membrane 120 at rejecting the fluorescent tracer, $C_P$ is the flow rate-independent cumulative-time concentration of the fluorescent tracer in permeate stream 116, and $C_F$ is the flow rate-independent cumulative-time concentration of the fluorescent tracer in feed stream 114. Additional performance parameters that may be calculated by controller 106 with reference to information stored in memory 122 and data from fluorometer 104 are described in U.S. Pat. No. 6,838,001, the entire contents of which are incorporated herein by reference.

In normal operation, the dye rejection efficiency of membrane 102 may be greater than 95 percent, such as greater than 98 percent, greater than 99 percent, or greater than 99.9 percent. For example, controller 106 may control fluorescent tracer pump 110 to introduce an amount of fluorescent tracer into feed stream 114 effective to achieve a concentration ranging from 10 parts per billion (ppb) to 100,000 ppb, such as from 10 ppb to 1000 ppb, or from 10 ppb to 10,000 ppb. By comparison, the amount of fluorescent tracer passing through membrane 102 and present in permeate stream 116 at these feed stream concentrations may be less than 10 ppb, such as less than 5 ppb, or less than 1 ppb, or less than 100 parts per trillion (ppt).

If the efficiency of membrane 102 determined as outlined above is less than a threshold efficiency (e.g., which may be any one of the normal operation values outlined above), the operator may take a variety of different corrective actions. In some examples, the operator replaces membrane 102 with a new membrane. As another example, the operator may adjust (e.g., reduce) the flow rate of the feed stream delivered to membrane 102, e.g., by controlling fluid pressurization pump 108. As still another example, when system 100 includes a bank of multiple membranes, the operator may bypass membrane 102 and use only membranes exhibiting a suitable efficiency for the separation process.

In general, the fluorescent tracer introduced into feed stream 114 is an inert tracer. The term "inert" refers to a fluorescent tracer that is not appreciably or significantly affected by any other chemistry in the system, or by the other system parameters such as pH, temperature, ionic strength, redox potential, microbiological activity or biocide concentration. The fluorescent tracer should be transportable with the water of the membrane separation system and thus substantially, if not wholly, water-soluble therein at the concentration it is used, under the temperature and pressure conditions specific and unique to the membrane separation system. In other words, the fluorescent tracer may display properties similar to a solute of the membrane separation process in which it is used.

In some examples, the fluorescent tracer added to feed stream 114 is a component of a formulation, rather than as a separate component, such as a dry solid or neat liquid. For example, the fluorescent tracer may be contained in (e.g., intermixed with) treatment chemicals injected into feed stream 114 to enhance the membrane separation process, e.g., antiscalants that retard/prevent membrane scale deposition, antifoulants that retard/prevent membrane fouling, biodispersants, microbial-growth inhibiting agents, such as biocides and cleaning chemicals that remove membrane deposits. The fluorescent tracer may be part of the treatment chemical itself, such as fluorescent-tagged polymer. Additionally or alternatively, the fluorescent tracer may be implemented using a fluorescent-tagged nanoparticle. The composition containing the fluorescent tracer may include an aqueous or other water-soluble solution or other substantially homogeneous mixture that disperses with reasonable rapidity in the membrane separation system to which it is added. In applications where the fluorescent tracer composition (or product containing the fluorescent tracer) is in solid form, fluorescent tracer pump 110 may be replaced with a solid metering device.

A variety of different and suitable types of compounds can be utilized as fluorescent tracers. Example fluorescent compounds that can be used in system 100 include, but are not limited to: 3,6-acridinediamine, N,N,N',N'-tetramethyl-, monohydrochloride, also known as Acridine Orange (CAS Registry No. 65-61-2); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; anthra[9,1,2-cde]benzo[rst]pentaphene-5, 10-diol, 16,17-dimethoxy-, bis(hydrogen sulfate), disodium salt, also known as Anthrasol Green IBA (CAS Registry No. 2538-84-3, aka Solubilized Vat Dye); bathophenanthrolinedisulfonic acid disodium salt (CAS Registry No. 52746-49-3); amino 2,5-benzene disulfonic acid (CAS Registry No. 41184-20-7); 2-(4-aminophenyl)-6-methylbenzothiazole (CAS Registry No. 92-364); 1H-benz[de]isoquinoline-5-sulfonic acid, 6-amino-2,3-dihydro-2-(4-methylphenyl)1,3-dioxo-, monosodium salt, also known as Brilliant Acid Yellow 8G (CAS Registry No. 2391-30-2, aka Lissamine Yellow FF, Acid Yellow 7); phenoxazin-5-ium, 1-(aminocarbonyl)-7-(diethylamino)-3,4-dihydroxy-, chloride, also known as Celestine Blue (CAS Registry No. 1562-90-9); benzo[a]phenoxazin-7-ium, 5,9-diamino-, acetate, also known as cresyl violet acetate (CAS Registry No. 10510-54-0); 4-dibenzofuransulfonic acid (CAS Registry No. 42137-76-8); 3-dibenzofuransulfonic acid (CAS Registry No. 215189-98-3); 1-ethylquinaldinium iodide (CAS Registry No. 606-53-3); fluorescein (CAS Registry No. 2321-07-5); fluorescein, sodium salt (CAS Registry No. 518-47-8, aka Acid Yellow 73, Uranine); Keyfluor White ST (CAS Registry No. 144470-48-4, aka Flu. Bright 28); benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Keyfluor White CN (CAS Registry No. 16470-24-9); C.I. Fluorescent Brightener 230, also known as Leucophor BSB (CAS Registry No. 68444-86-0); benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Leucophor BMB (CAS Registry No. 16470-249, aka Leucophor U, Flu. Bright. 290); 9,9'-biacridinium, 10,10'-dimethyl-, dinitrate, also known as Lucigenin (CAS Registry No. 2315-97-1, aka bis-N-methylacridinium nitrate); 1-deoxy-1-(3,4-dihydro-7, 8-dimethyl-2,4-dioxobenzo[g]pteridin-10(2H)-yl)-D-ribitol, also known as Riboflavin or Vitamin B2 (CAS Registry No. 83-88-5); mono-, di-, or tri-sulfonated napthalenes, including but not limited to 1,5-naphthalenedisulfonic acid, disodium salt (hydrate) (CAS Registry No. 1655-29-4, aka 1,5-NDSA hydrate); 2-amino-1-naphthalenesulfonic acid (CAS Registry No. 81-16-3); 5-amino-2-naphthalenesulfonic acid (CAS Registry No. 119-79-9); 4-amino-3-hydroxy-1-aphthalenesulfonic acid (CAS Registry No. 90-51-7); 6-amino-4-hydroxy-2-naphthalenesulfonic acid (CAS Registry No. 116-63-2); 7-amino-1,3-naphthalenesulfonic acid, potassium salt (CAS Registry No. 79873-35-1); 4-amino-5-hydroxy-2,7-naphthalenedisulfonic acid (CAS Registry No. 90-20-0); 5-dimethylamino-1-naphthalenesulfonic acid (CAS Registry No. 4272-77-9); 1-amino-4-naphthalene sulfonic acid (CAS Registry No. 84-86-6); 1-amino-7-naphthalene sulfonic acid (CAS Registry No. 119-28-8); 2,6-naphthalenedicarboxylic acid, dipotassium salt (CAS Registry No. 2666-06-0); 3,4,9,10-perylenetetracarboxylic acid (CAS Registry No. 81-32-3); C.I. Fluorescent Brightener 191, also known as Phorwite CL (CAS Registry No. 12270-53-0); C.I. Fluorescent Brightener 200, also known as Phorwite BKL (CAS Registry No. 61968-72-7); benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3); benzenesulfonic acid, 5-(2H-naphtho[1,2-d]triazol-2-yl)-2-(2-phenylethenyl)-, sodium salt, also known as Pylaklor White S-ISA (CAS Registry No. 6416-68-8); 1,3,6,8-pyrenetetrasulfonic acid, tetrasodium salt (CAS Registry No. 59572-10-0); pyranine (CAS Registry No. 6358-69-6, aka 8-hydroxy-1, 3, 6-pyrenetrisulfonic acid, trisodium salt),quinoline (CAS Registry No. 91-22-5); 3H-phenoxazin-3-one, 7-hydroxy-, 10-oxide, also known as Rhodalux (CAS Registry No. 550-82-3); xanthylium, 9-(2,4-dicarboxyphenyl)-3,6-bis(diethylamino)-, chloride, disodium salt, also known as Rhodamine WT (CAS Registry No. 37299-86-8); phenazinium, 3,7-diamino-2,8-dimethyl-5-phenyl-, chloride, also known as Safranine 0 (CAS Registry No. 477-73-6); C.I. Fluorescent Brightener 235, also known as Sandoz CW (CAS Registry No. 56509-06-9); benzenesulfonic acid, 2,2'-(1,2-thenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220); benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4); xanthylium, 3,6-bis(diethylamino)-9-(2,4-disulfophenyl)-, inner salt, sodium salt, also known as Sulforhodamine B (CAS Registry No. 3520-42-1, aka Acid Red 52); benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1); Tinopol DCS (CAS Registry No. 205265-33-4); benzenesulfonic acid, 2,2'-([1,1'-biphenyl]-4,4'-diyldi-2,1-ethenediyl)bis-, disodium salt also known as Tinopal CBS-X (CAS Registry No. 27344-41-8); benzenesulfonic acid, 5-(2H-naphtho[1,2-d]triazol-2-yl)2-(2-phenylethenyl)-, sodium salt, also known as Tinopal RBS 200, (CAS Registry No. 6416-68-8); 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

In some examples, the fluorescent tracer is not a visible dye, e.g., such that the fluorescent tracer is a chemical species that does not have a strong absorption of electromagnetic radiation in the visible region, which extends from about 4000 Angstroms to about 7000 Angstroms (from about 400 nanometers ("nm") to about 700 nm). For example, the fluorescent tracer may be chosen from a class of materials which are excited by absorption of light and produce fluorescent light emission, where the excitation and emission light occurs at any point within the far ultraviolet to near infrared spectral regions (e.g., wavelengths from 200-800 nm).

Figure 4:
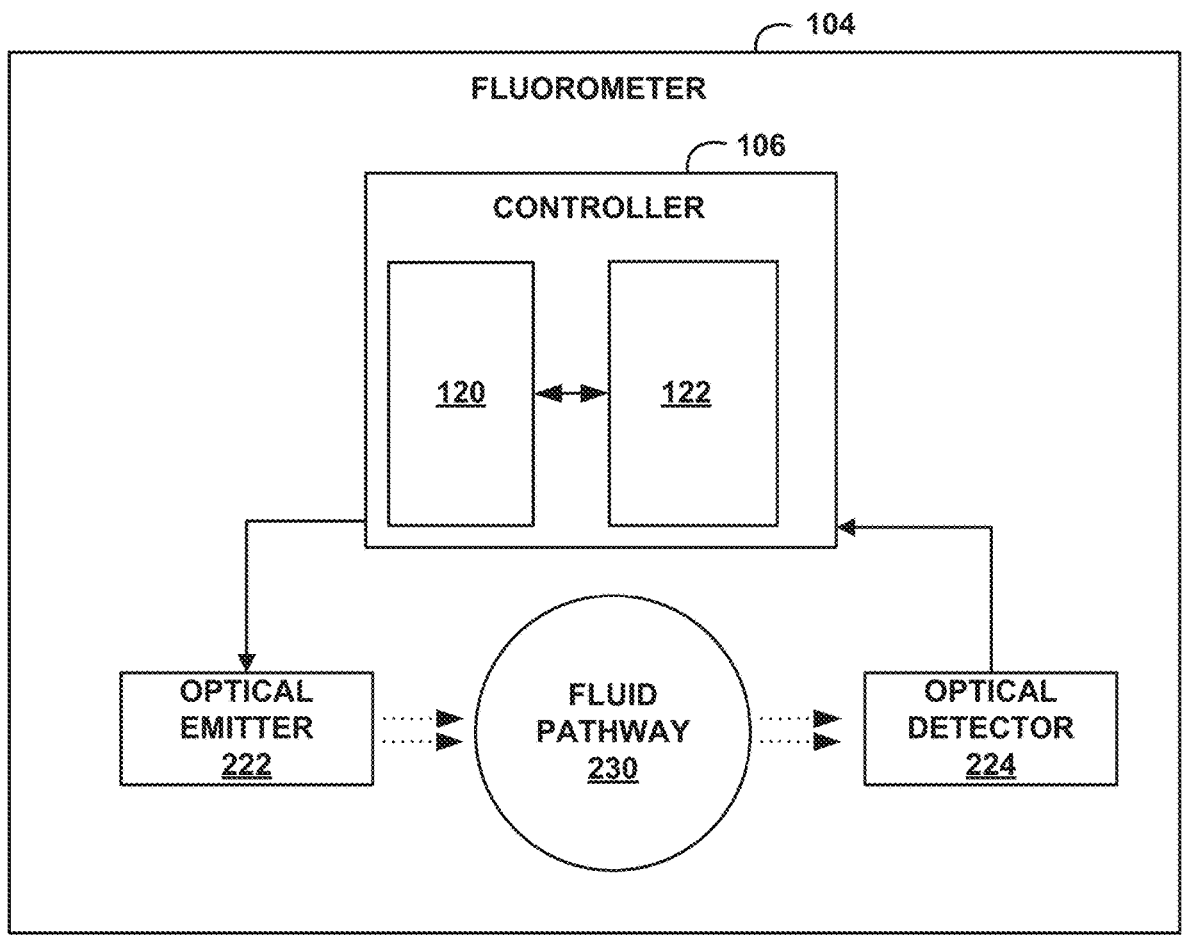
FIG. 4 is a block diagram illustrating an example fluorometer that may be used in the example membrane separation system of FIG. 1.

FIG. 4 is a block diagram illustrating an example of fluorometer 104 that may be used in the membrane separation system of FIG. 1. Fluorometer 104 includes controller 106, one or more optical emitters 222 (referred to herein as "optical emitter 222"), and one or more optical detectors 224

(referred to herein as "optical detector 224"). Controller 106 includes previously-described processor 120 and a memory 122. Optical emitter 222 directs light into fluid pathway 230 and optical detector 224 receives transmitted light on the opposite side of the fluid pathway. The components of fluorometer 104 may be implemented on a single printed circuit board (PCB) or may be implemented using two or more PCB boards. Further, in some examples, fluorometer 104 communicates with an external device, such as a system controller controlling system 100, remote server, cloud-computing environment, or other physically remote computing device.

For purposes of discussion, controller 106 described with respect to FIG. 1 as controlling system 100 is also illustrated as the controller controlling fluorometer 104. In practice, fluorometer 104 may have a separate controller from one or more system controller controlling the overall operation of system 100. Accordingly, it should be appreciated that the computing functionality attributed to controller 106 in system 100 and fluorometer 104 may be performed on any one or more controllers associated with the system, be it physically onsite or remotely located, and the functionalities described herein are not limited to being performed on any specific hardware device.

Memory 122 stores software and data used or generated by controller 106. For example, memory 122 may store calibration data used by controller 106 to determine a concentration of a fluorescent tracer in fluid medium passing through fluid pathway 230. As another example, memory 122 may store fluorescent tracer concentration data measured for feed stream 114 and/or permeate stream 116 and used by controller to determine flow rate-independent cumulative-time concentrations.

For ease of description, computer processing functions of system 100 are described as being performed by controller 106 of fluorometer 104. It should be appreciated, however, that hardware and/or software operating outside of fluorometer 104 may be utilized to implement functions attributed to controller 106 of fluorometer 104 in this disclosure, and the application is not limited in this respect.

Processor 120 runs software stored in memory 122 to perform functions attributed to fluorometer 104 and controller 106 in this disclosure. Components described as processors within controller 106, controller 106, or any other device described in this disclosure may each include one or more processors, such as one or more microprocessors, digital signal processors (DSPs), application specific integrated circuits (ASICs), field programmable gate arrays (FPGAs), programmable logic circuitry, or the like, either alone or in any suitable combination.

Optical emitter 222 includes at least one optical emitter that emits radiation having a specified wavelength or wavelength range. In different examples, optical emitter 222 can emit radiation continuously or intermittently. In some examples, optical emitter 222 emits radiation at a plurality of discrete wavelengths. For example, optical emitter 222 may emit at two, three, four or more discrete wavelengths.

Optical emitter 222 can emit light at any suitable wavelength, as described in greater detail below. In some examples, optical emitter 222 emits light within a spectrum ranging from 10 nm to 700 nm. Light emitted by optical emitter 222 propagates through fluid pathway 230 of fluorometer 104 and may be detected by optical detector 224. In response to receiving the optical energy, fluorescing molecules within the fluid may excite, causing the molecules to produce fluorescent emissions. The fluorescent emissions, which may or may not be at a different frequency than the energy emitted by optical emitter 222, may be generated as excited electrons within fluorescing molecules change energy states. The energy emitted by the fluorescing molecules may be detected by optical detector 224. For example, optical detector 224 may detect fluorescent emissions emitted in a frequency range from 50 nm to 800 nm.

Optical detector 224 includes at least one optical detector that detects radiation within associated wavelength ranges within the UV light spectrum. Optical detector 224 detects radiation that is emitted by optical emitter 222 and that has propagated through fluid pathway 230 and any fluid solution in the fluid pathway. Optical detector 224 may be implemented using multiple detectors, one for each wavelength or wavelength range, or may be implemented using a single detector such as, e.g., a detector that is programmable to detect multiple wavelength ranges.

Controller 106 controls the operation of optical emitter 222 and receives signals concerning the amount of light detected by optical detector 224. In some examples, controller 106 further processes signals, e.g., to develop concentration measurements and corresponding flow rate-independent cumulative-time concentrations based on the light detected by optical detector 224. Controller 106 may further determine an efficiency for membrane 102 based on comparison of the flow rate-independent cumulative-time concentration of the feed stream to the flow rate-independent cumulative-time concentration for the permeate stream.

As noted, controller 106 (FIG. 1) or another controller may perform one or more functions generally attributed to controller 106 in this disclosure. Accordingly, it should be appreciated that functions attributed to controller 106 herein are for ease of description, and the described functions may, in fact, be implemented within fluorometer 104 or within one or more separate devices, which may or may not be communicatively coupled to fluorometer 104.

Figure 5:
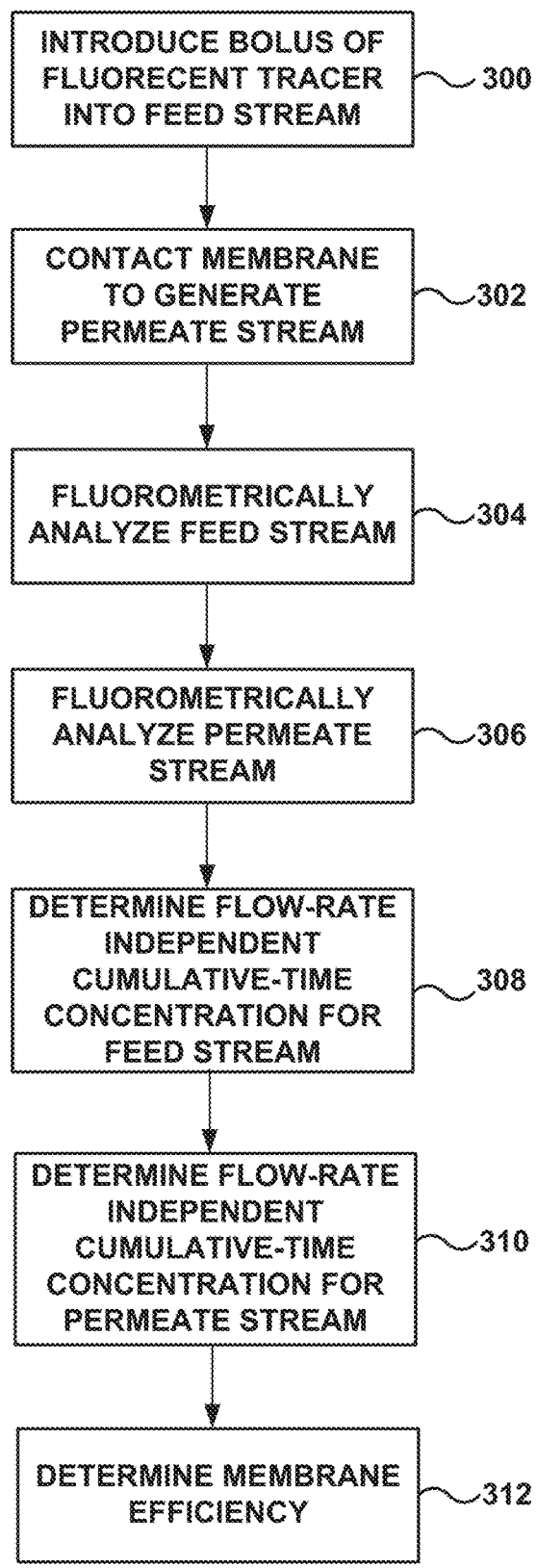
FIG. 5 is a flow diagram of an example technique for monitoring membrane efficiency.

FIG. 5 is a flow diagram of an example technique for monitoring membrane efficiency. The technique of FIG. 5 is described with reference to system 100 in FIG. 1 and fluorometer 104 in FIG. 2, although can be performed in other systems and with other fluorometer configurations, e.g., as described herein.

With reference to FIG. 5, the technique includes introducing a bolus of fluorescent tracer into feed stream 114. (300) Operating under the control of controller 106 in system 100, fluorescent tracer pump 110 may be controlled to introduce fluorescent tracer into feed stream 114 from fluorescent tracer source 113. The amount of fluorescent tracer introduced into feed stream 114 may be effective to provide a concentration of fluorescent tracer in feed stream 114 within any of the concentration ranges discussed herein, or even concentration ranges outside of those discussed herein in suitable applications. The fluorescent tracer may be introduced at a rate and/or for a duration less than is required for an equilibrium concentration of tracer to be achieved in permeate stream 116.

Feed stream 114 contacts membrane 102, separating the feed stream into permeate stream 116 and concentrate stream 118. (302) Membrane 102 may be configured as a cross flow membrane, dead-end flow membrane, or have yet other configuration. In one example, system 100 is a reverse osmosis system. Feed stream pressure pump 108 can pressurize a source of liquid to be purified, overcoming the osmotic pressure of membrane 102 to drive the reverse osmosis process and generate the permeate stream 116.

During operation, fluorometer 104 can fluorometrically analyze feed stream 114 in which the fluorescent tracer is introduced. (304) For example, fluorometer 104 may be installed online in system 100 downstream of the tracer injection point into feed stream 104 (e.g., either in the main fluid conveyance line carrying the bulk of the feed stream or via a slipstream connecting fluorometer 104 to the main conveyance line). Feed stream 114 or a sample thereof can flow through fluid pathway 230 for measurement by fluorometer 104. Controller 106 executing instructions stored in memory 122 can control optical emitter 222 to direct light selected to be at an excitation wavelength for the fluorescent tracer introduced into feed stream 114 into the fluid under analysis. Fluorescent tracer molecules within permeate under analysis may fluoresce at a wavelength different than the excitation wavelength in response to the energy emitted at the excitation wavelength. Optical detector 224 can detect the fluorescent emissions emitted by the tracer molecules present within the permeate. The magnitude of the fluorescent emissions detected by optical detector 224 may vary based on the concentration of the fluorescent tracer molecules present in the feed liquid under analysis. Processor 120 of controller 106 can determine a measured concentration of the fluorescent tracer in feed stream 114 based on the fluorescent emissions detected by optical detector 224 and calibration information stored in memory 122. The measured concentration of fluorescent tracer for feed stream 114 determined by processor 120 can be stored in memory 122 for subsequent use in determining a flow-rate independent cumulative-time concentration.

Fluorometer 104 can also fluorometrically analyze permeate stream 116 generated from the feed stream 114 in which the fluorescent tracer is introduced. (306) Fluorometer 104 may similarly be installed online in system 100 to measure permeate 116 flowing from membrane 102 (e.g., either in the main fluid conveyance line carrying the bulk of the permeate stream or via a slipstream connecting fluorometer 104 to the main conveyance line). Permeate stream 116 or a sample thereof can flow through fluid pathway 230 for measurement by fluorometer 104. Controller 106 executing instructions stored in memory 122 can control optical emitter 222 to direct light selected to be at an excitation wavelength for the fluorescent tracer introduced into feed stream 114 into the permeate fluid under analysis. Fluorescent tracer molecules within permeate under analysis may fluoresce at a wavelength different than the excitation wavelength in response to the energy emitted at the excitation wavelength. Optical detector 224 can detect the fluorescent emissions emitted by the tracer molecules present within the permeate. The magnitude of the fluorescent emissions detected by optical detector 224 may vary based on the concentration of the fluorescent tracer molecules present in the permeate under analysis. Processor 120 of controller 106 can determine a measured concentration of the fluorescent tracer in permeate stream 116 based on the fluorescent emissions detected by optical detector 224 and calibration data stored in memory 122. The first measured concentration of fluorescent tracer determined by processor 120 can be stored in memory 122 for subsequent use during the calibration procedure. The measured concentration of fluorescent tracer for permeate stream 116 determined by processor 120 can be stored in memory 122 for subsequent use in determining a flow-rate independent cumulative-time concentration.

In the technique of FIG. 5, processor 120 of controller 106 can determine a flow rate-independent cumulative-time concentration of the fluorescent tracer in feed stream 114 based on the measured concentration of the fluorescent tracer in the feed stream (308). In some examples, processor 120 integrates an area under the measured concentration versus time curve corresponding to when the bolus of tracer was injected into feed stream 114 and the tracer concentration in the feed stream was monitored by fluorometer 104. Controller 104 may integrate over the entire concentration curve during the entire time fluorometer 104 was measuring the concentration of tracer in the feed stream or a subset thereof. For example, controller 104 may exclude from integration periods of time during which no tracer or substantially no tracer was measured in the feed stream. In either case, the result time period over which the concentration curve is integrated may be designated as a first time period. Controller 104 can store the determined flow rate-independent cumulative-time concentration for feed stream 114 in memory 122.

Processor 120 of controller 106 can also determine a flow rate-independent cumulative-time concentration of the fluorescent tracer in permeate stream 116 based on the measured concentration of the fluorescent tracer in the permeate stream (310). In some examples, processor 120 integrates an area under the measured concentration versus time curve corresponding to when the bolus of tracer was injected into feed stream 114 and the tracer concentration in the permeate stream was monitored by fluorometer 104. Controller 104 may integrate over the entire concentration curve during the entire time fluorometer 104 was measuring the concentration of tracer in the feed stream or a subset thereof. For example, controller 104 may exclude from integration periods of time during which no tracer or substantially no tracer was measured in the feed stream. In either case, the result time period over which the concentration curve is integrated may be designated as a second time period. Controller 104 can store the determined flow rate-independent cumulative-time concentration for permeate stream 116 in memory 122.

In the example of FIG. 5, controller 106 determines a efficiency for membrane 102 based on the determined flow rate-independent cumulative-time concentration for feed stream 114 and the flow rate-independent cumulative-time concentration for permeate stream 116 (312). In some examples, controller 106 ratios the flow rate-independent cumulative-time concentration for feed stream 114 to the flow rate-independent cumulative-time concentration for permeate stream 116. For example, controller 106 may determine an efficiency for membrane 102 according to equation 2 introduced above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following examples may provide additional details about membrane separation systems and membrane efficiency monitoring techniques according to the disclosure.

Figure 6:
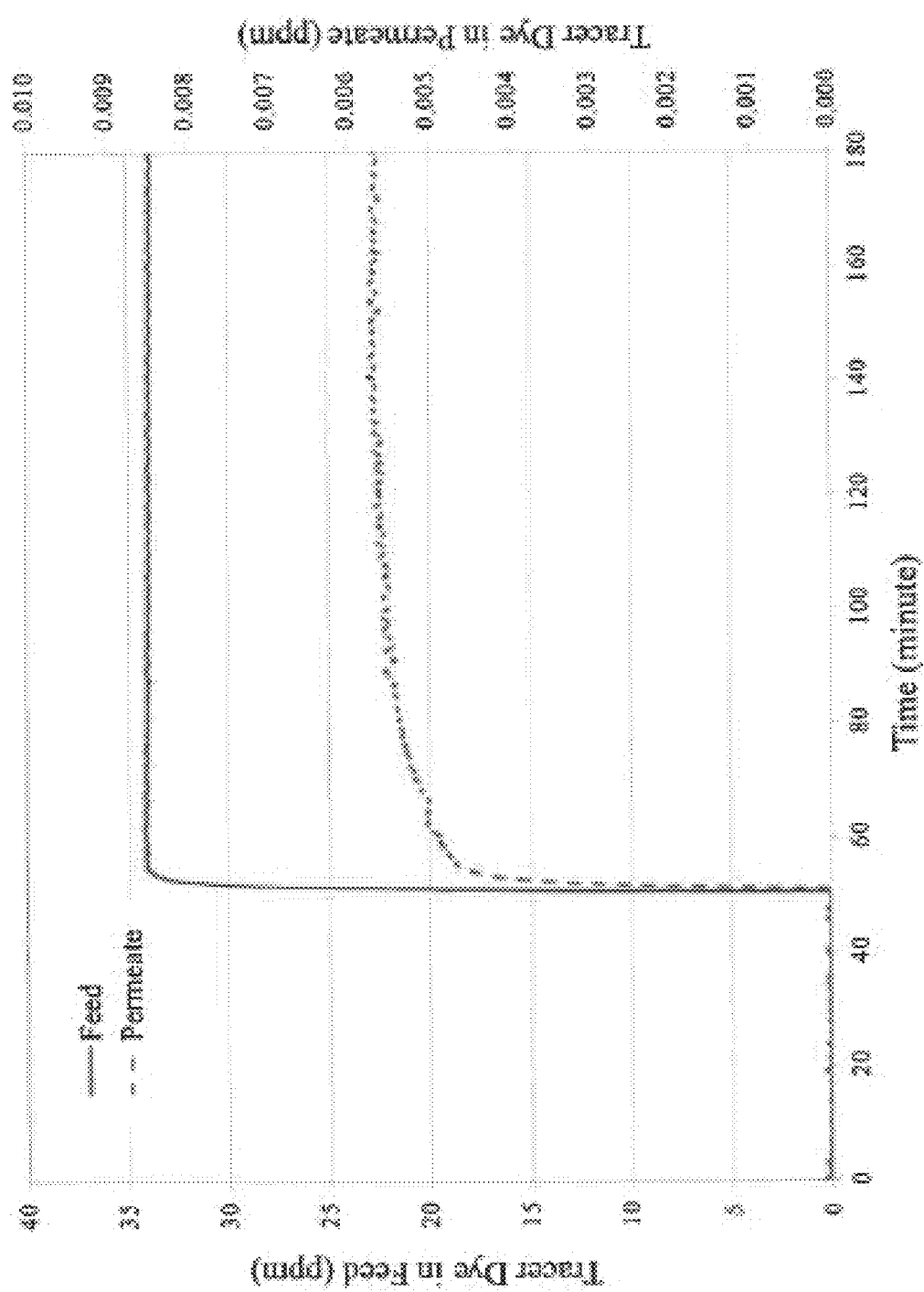
FIG. 6 illustrates example tracer concentrations observed in a feed stream and a permeate streams for an experimental system.
Figure 7:
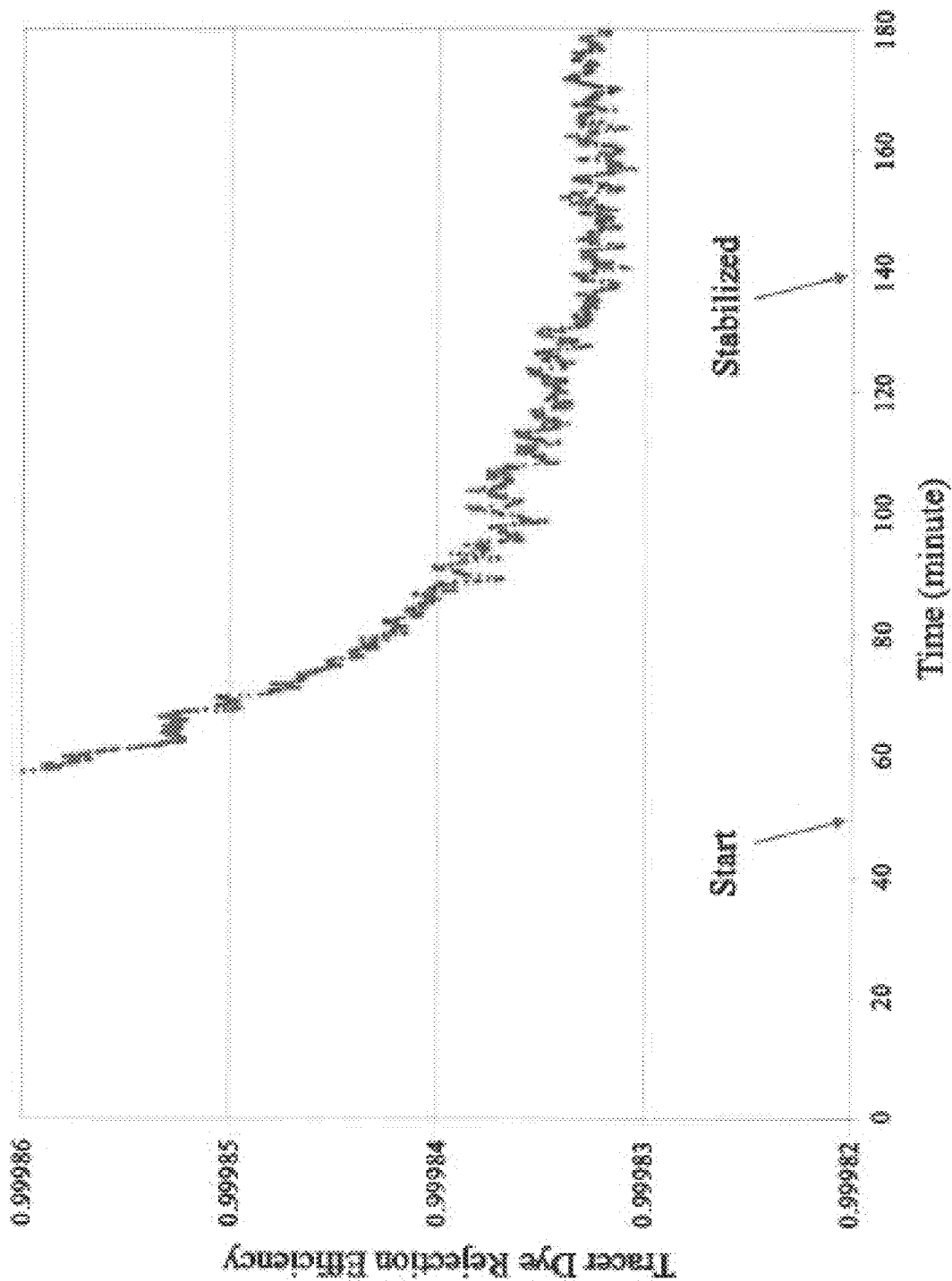
FIG. 7 is a plot of tracer rejection efficiency versus time for the data shown in FIG. 6.

Example 1: Traditional Membrane Efficiency with Extended Dosing to Obtain Equilibrium Tracer Concentration in the Permeate Stream An experiment was conducted to observe the amount of dosing time needed to achieve equilibrium tracer concentration in the permeate stream. Tracer was introduced into a feed stream supplied to a 2.5 inch membrane element. The concentrations of tracer in the feed stream and the permeate stream were monitored prior to the initiation of tracer dosing and after a continuous dosing rate of tracer was delivered to the feed stream. FIG. 6 illustrates the tracer concentrations observed in the feed stream and the permeate streams for the experimental system. FIG. 7 is a plot of tracer rejection efficiency versus time for the data shown in FIG. 6.

In the example, tracer dye was started to be injected at t=50 min, but it took 90 minutes to obtain a stable rejection efficiency. The average rejection efficiency at steady state was calculated at 0.999832 (or 3.76 log). The data show that extended tracer dosing is needed to obtain equilibrium tracer conditions in the permeate stream for calculating rejection efficiency.

Example 2: Quick Dosing Membrane Efficiency Determination

An experiment was conducted according to the techniques of the present disclosure to evaluate the efficacy of determining membrane efficiency using a short tracer bolus injection. Deionized water was fed to a system equipped with a single 2.5 inch reverse osmosis element (FILMTEC BW30-2540) while continuously feeding 10% NaCl solution. Feed and permeate flow rates were maintained at 1.93 gpm and 0.19 gpm, respectively, and the water temperature at 77° F. (or 25° C.). This is the same experimental apparatus and conditions used for Example 1 discussed above.

After all conditions were stabilized, tracer dye was injected for two minutes while monitoring the fluorescence in the feed and permeate streams. FIG. 2 shows that the tracer dye concentration in the feed and permeate streams monitored during the experimental example. The data show the tracer concentration in the in feed surging about 30 seconds after the dye injection was started. Dye concentration in the permeate stream lags behind that in feed due to the hydraulic delay.

In order to determine dye rejection efficiency for the membrane, flow-rate independent cumulative-time concentrations were calculated for the feed and permeate streams using Equation 1. When the curve was integrated from 5 min, which is when the tracer dye injection started, to 30 min, the flow-rate independent cumulative-time concentrations for the feed and permeate were calculated to be 4,209.537 ppm·sec and 0.633951 ppm·sec, respectively. A rejection efficiency was calculated using these values and Equation 2 to be at 0.999849 (or 3.82 log). This rejection efficiency is remarkably similar to the value obtained after injecting the same tracer dye for over 90 minutes (0.999832 (or 3.76 log)), according to Example 1 above.

The invention claimed is:

1. A method for monitoring an osmosis membrane separation process comprising:
   introducing a bolus of fluorescent tracer into a feed stream using a fluorescent tracer pump;
   contacting an osmosis membrane with the feed stream, thereby generating a permeate stream and a concentrate stream;
   controlling, by a controller, one or more fluorometers to fluorometrically analyze the feed stream and determining therefrom a measured concentration of the fluorescent tracer in the feed stream over a first period of time corresponding to the bolus;
   controlling, by the controller, the one or more fluorometers to fluorometrically analyze the permeate stream and determining therefrom a measured concentration of the fluorescent tracer in the permeate stream over a second period of time corresponding to the bolus;
   determining a flow rate-independent cumulative-time concentration of the fluorescent tracer in the feed stream based on the measured concentration of the fluorescent tracer in the feed stream over the first period of time;
   determining a flow rate-independent cumulative-time concentration of the fluorescent tracer in the permeate stream based on the measured concentration of the fluorescent tracer in the permeate stream over the second period of time; and
   determining an efficiency of the osmosis membrane based on comparison of the flow rate-independent cumulative-time concentration of the fluorescent tracer in the feed stream to the flow rate-independent cumulative-time concentration of the fluorescent tracer in the permeate stream.

2. The method of claim 1, wherein introducing the bolus of fluorescent tracer comprises introducing the fluorescent tracer for a period of time ranging from 1 second to 60 minutes.

3. The method of claim 1, wherein introducing the bolus of fluorescent tracer comprises introducing the fluorescent tracer for a period of time ranging from 30 seconds to 5 minutes.

4. The method of claim 1, wherein introducing the bolus of fluorescent tracer comprises introducing the fluorescent tracer into the feed stream at a substantially constant rate.

5. The method of claim 1, wherein
   fluorometrically analyzing the feed stream over the first period of time corresponding to the bolus comprises fluorometrically analyzing the feed stream for a time within a range from 0 to 60 minutes following initial introduction of the bolus of fluorescent tracer, and fluorometrically analyzing the permeate stream over the second period of time corresponding to the bolus comprises fluorometrically analyzing the permeate stream for a time within a range from 0 to 240 minutes following initial introduction of the bolus of fluorescent tracer.

6. The method of claim 5, wherein the second period of time is the same as the first period of time.

7. The method of claim 5, wherein the second period of time is shifted from the first period of time by at least 1 minute.

8. The method of claim 1, wherein determining the flow rate-independent cumulative-time concentration of the fluorescent tracer in the feed stream comprises integrating an area under a curve of the measured concentration of the fluorescent tracer in the feed stream over the first period of time.

9. The method of claim 1, wherein determining the flow rate-independent cumulative-time concentration of the fluorescent tracer in the permeate stream comprises integrating an area under a curve of the measured concentration of the fluorescent tracer in the permeate stream over the second period of time.

10. The method of claim 1, wherein determining the efficiency of the osmosis membrane based on comparison of the flow rate-independent cumulative-time concentration of the fluorescent tracer in the feed stream to the flow rate-independent cumulative-time concentration of the fluorescent tracer in the permeate stream comprises determining the efficiency according to an equation:

$$R = 1 - \frac{C_P}{C_F}$$

wherein R is the efficiency of the osmosis membrane at rejecting the fluorescent tracer, $C_P$ is the flow rate-independent cumulative-time concentration of the fluorescent tracer in the permeate stream, and $C_F$ is the flow rate-independent cumulative-time concentration of the fluorescent tracer in the feed stream.

11. The method of claim 1, wherein the feed stream comprises at least one of a waste water stream and a recycle water stream.

12. The method of claim 1, wherein the fluorescent tracer is an inert fluorescent tracer.

13. The method of claim 1, wherein the bolus of fluorescent tracer introduced into the feed stream is effective to cause the flow rate-independent cumulative concentration of the fluorescent tracer in the feed stream to range from 1 ppm-sec to 50,000 ppm-sec.

14. A system comprising:
a fluorescent tracer pump configured to introduce a bolus of fluorescent tracer into a feed stream;
a reverse osmosis membrane configured to separate the feed stream into a permeate stream and a concentrate stream;
one or more fluorometers configured to fluorometrically analyze the feed stream and the permeate stream; and
a controller communicatively coupled to the one or more fluorometers, wherein the controller is configured to:
control the one or more fluorometers to fluorometrically analyze the feed stream and determine therefrom a measured concentration of the fluorescent tracer in the feed stream over a first period of time corresponding to the bolus;
control the one or more fluorometers to fluorometrically analyze the permeate stream and determine therefrom a measured concentration of the fluorescent tracer in the permeate stream over a second period of time corresponding to the bolus;
determine a flow rate-independent cumulative-time concentration of the fluorescent tracer in the feed stream based on the measured concentration of the fluorescent tracer in the feed stream over the first period of time;
determine a flow rate-independent cumulative-time concentration of the fluorescent tracer in the permeate stream based on the measured concentration of the fluorescent tracer in the permeate stream over the second period of time; and
determine an efficiency of the reverse osmosis membrane based on comparison of the flow rate-independent cumulative-time concentration of the fluorescent tracer in the feed stream to the flow rate-independent cumulative-time concentration of the fluorescent tracer in the permeate stream.

15. The system of claim 14, wherein the controller is further communicatively coupled to the fluorescent tracer pump and configured to control the fluorescent tracer pump to introduce the bolus of fluorescent tracer into the feed stream.

16. The system of claim 15, wherein the controller is configured to control the fluorescent tracer pump to introduce the bolus of fluorescent tracer into the feed stream for a period of time ranging from 1 second to 60 minutes.

17. The system of claim 15, wherein the controller is configured to control the fluorescent tracer pump to introduce the bolus of fluorescent tracer into the feed stream for a period of time ranging from 30 seconds to 5 minutes.

18. The system of claim 14, wherein the one or more fluorometers comprise a first fluorometer positioned to fluorometrically analyze the feed stream and a second fluorometer positioned to fluorometrically analyze the permeate stream.

19. The system of claim 14, wherein the first period of time is within a range from 0 to 60 minutes following initial introduction of the bolus of fluorescent tracer and the second period of time is within a range from 0 to 240 minutes following initial introduction of the bolus of fluorescent tracer.

20. The system of claim 19, wherein the second period of time is the same as the first period of time.

21. The system of claim 19, wherein the second period of time is shifted from the first period of time by at least 1 minute.

22. The system of claim 14, wherein the controller is configured to:
determine the flow rate-independent cumulative-time concentration of the fluorescent tracer in the feed stream by at least integrating an area under a curve of the measured concentration of the fluorescent tracer in the feed stream over the first period of time; and
determine the flow rate-independent cumulative-time concentration of the fluorescent tracer in the permeate stream by at least integrating an area under a curve of the measured concentration of the fluorescent tracer in the permeate stream over the second period of time.

23. The system of claim 14, wherein the controller is configured to determine the efficiency of the reverse osmosis membrane based on comparison of the flow rate-independent cumulative-time concentration of the fluorescent tracer in the feed stream to the flow rate-independent cumulative-time concentration of the fluorescent tracer in the permeate stream by at least determining the efficiency according to an equation:

$$R = 1 - \frac{C_P}{C_F}$$

wherein R is the efficiency of the reverse osmosis membrane at rejecting the fluorescent tracer, $C_P$ is the flow rate-independent cumulative-time concentration of the fluorescent tracer in the permeate stream, and $C_F$ is the flow rate-independent cumulative-time concentration of the fluorescent tracer in the feed stream.

24. The system of claim 15, wherein the controller is configured to control the fluorescent tracer pump to introduce the bolus of fluorescent tracer into the feed stream effective to cause the flow rate-independent cumulative concentration of the fluorescent tracer in the feed stream to range from 1 ppm-sec to 50,000 ppm-sec.

* * * * *